United States Patent Office 3,718,361
Patented Feb. 27, 1973

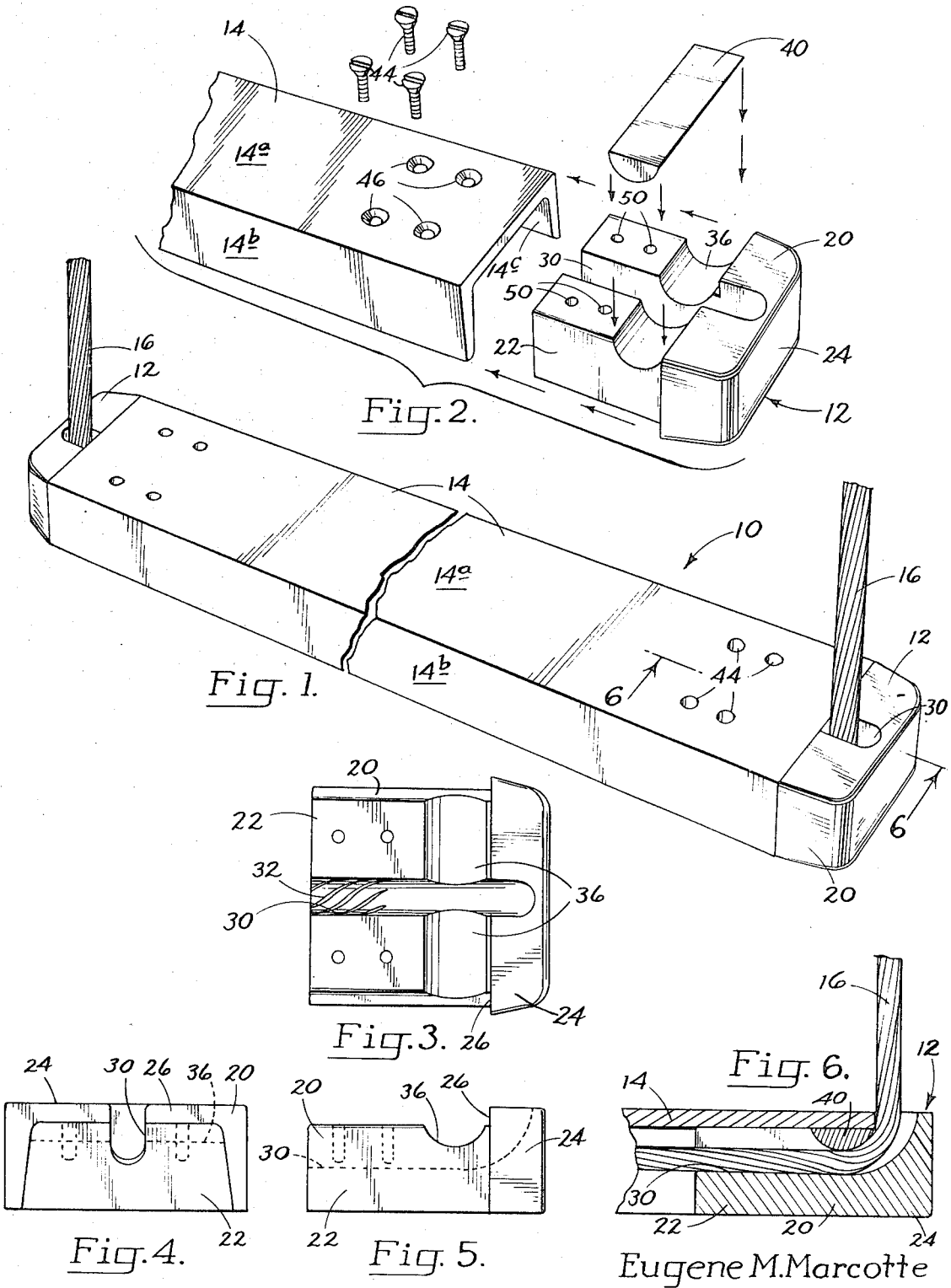

3,718,361
BEAM END CAP
Eugene M. Marcotte, Vancouver, Wash., assignor to West Coast Rope and Rigging of Portland, Inc., Portland, Oreg.
Filed June 11, 1971, Ser. No. 152,151
Int. Cl. B66c 1/16
U.S. Cl. 294—67 E          5 Claims

ABSTRACT OF THE DISCLOSURE

An end cap for a load-handling device including an elongated beam and a cable extending along the underside of the beam and out from an end of the beam. The end cap secures the cable and protects the end of the beam. The cap includes a block member secured to the beam having one portion which fits against the underside of the beam and another portion which covers the end of the beam and is disposed outwardly therefrom. A cable-receiving groove is formed in the top of the block member and a rounded clamping member overlies the groove to clamp a cable in the groove and to train such cable in an arc around the end of the beam.

---

This invention relates to an end cap for a beam.

In the handling of loads a spreader beam is often used. Such a spreader beam generally is an elongated rigid beam supported substantially horizontally on, and secured to, a mid-portion of a cable. In the past, the supporting cable has been secured to the beam with portions of the cable merely bent over the ends of the beam in an unprotected state. A cable connected to a beam in this manner is subject to damage by being hit against other objects, and the sharp bend produced in the cable as it extends over the end of the beam will further reduce the life of the cable. Further, the exposed end of such a beam may damage articles against which it may be swung with the cable.

A general object is to provide a novel end cap for a beam which may be secured to the end of such beam to secure a cable thereto and to provide a protective cover for the end of the beam and for a portion of the cable which extends outwardly from an end of the beam.

Another object of the invention is to provide, for a load-handling device including an elongated beam and a cable extending longitudinally along the underside of the beam and out from an end of the beam, a protective beam end cap which is operable to secure the cable and beam together and also to provide a radius about which the cable may extend at the end of the beam.

More specifically, an object is to provide a novel end cap for a beam, including a block member, which may be secured to the underside of an end of such a beam and has a portion which is disposed outwardly from and provides a protective cover for the end of the beam. The block member has a cable-receiving groove extending along its upper surface, and means associated with this groove for clamping a cable in the groove. The means for clamping a cable in the groove is a rounded member disposed adjacent the end of the beam. This rounded member also provides a radius about which the cable may bend as it extends outwardly from the end of the beam.

These and other objects and advantages will become more fully apparent as the following description is read in conjunction with the drawings wherein:

FIG. 1 is a perspective view of a load-handling device including beam end caps according to the invention;

FIG. 2 is an exploded perspective view of an end of the beam and a beam end cap;

FIGS. 3, 4, and 5 are top, end and side views, respectively, of a block member of the end cap; and FIG. 6 is a cross-sectional view taken generally along the lines 6—6 in FIG. 1.

Referring now to the drawings, and first more specifically to FIG. 1, at 10 is indicated generally a load-handling device, or support, including beam end caps 12 according to the invention. The load-handling device includes an elongated rigid support beam, or channel member 14 and an elongated cable 16. The channel has a web 14a forming an upper, load-supporting surface for the beam, and a pair of elongated, spaced, depending flanges 14b, 14c extending axially along opposite edges of the web. A mid-portion of cable 16 extends along the underside of channel 14, longitudinally of the channel, and outwardly from opposite ends of the channel, as seen in FIG. 6. The ends of the cable may be attached to a crane or other lifting device. Such a load-handling device may be used for lifting loads supported on the beam, with cable 16 supporting the beam in a substantially horizontal position.

Referring to FIGS. 2 through 5, an end cap 12 includes a block member 20 having an inner end portion 22 and an outer end portion 24. Portion 22 of the block member has an outer contour which, when viewed from an end as seen in FIG. 4, substantially corresponds to the contour of the underside of beam 14. The outer portion 24 when viewed from an end, has an outer contour substantially corresponding to the outer contour of the beam. The outer side edges of portion 24 are rounded. A side surface 26 of portion 24 (see FIGS. 3, 4, and 5) forms an upstanding shoulder which is adjacent and faces in the direction of portion 22. Side surface 26 extends substantially normally outwardly from the upper and side surfaces of portion 22, and is formed to fit flush against the end of beam 14 when the block member is in its operative position, as illustrated in FIG. 1.

A cable-receiving groove 30 is formed in the upper surface of the block member. Groove 30 extends longitudinally of the block member fully along the top of portion 22 and partially along the upper surface of portion 24. As is best seen in FIGS. 5 and 6, the base of the groove extends substantially horizontally in portion 22 of the block member and curves in an arc upwardly in portion 24. Groove 30 is adapted to receive cable 16 as illustrated in FIG. 6. The base of the groove further includes ridges 32 as seen in FIG. 3, which engage spiral-wound strands in the cable.

Referring to FIGS. 2, 3 and 5, an elongated semi-cylindrical channel 36 extends across the top of portion 22 of the block member transversely of cable-receiving groove 30. An elongated, half-round clamping member 40, best seen in FIGS. 2 and 6, seats in channel 36 with its mid-portion overlying and extending into a portion of groove 30.

A plurality of screws 44 extend through bores 46 in beam 14 and into threaded bores 50 in portion 22 of the block member to secure the block member to the beam. With the block member so secured to the beam, portion 22 rests against the underside of web 14a, and between flanges 14b, 14c, side surface 26 of portion 24 abuts the end of the beam, and the remainder of portion 24 projects longitudinally outwardly from the end of the beam. As is best seen in FIG. 6, portion 24 of the block member and a portion of groove 30 extend outwardly from the end of the beam a distance greater than the diameter of the cable received in the groove.

To assemble such a load-handling device a mid-portion of cable 16 is extended along the underside of channel 14. With an end cap 12 removed from the beam as shown in FIG. 2, a portion of the cable adjacent the end of the beam is slipped into groove 30 and clamping member 40 is seated in channel 36 to overly the channel and cable. Portion 22 of the block member and clamping member 40 are then fit within the end of beam 14 with side surface 26 of the block member abutting the end of the beam. Screws 44 secure the block member to the underside of the channel. As the block member is drawn tight against the underside of the beam by the screws, clamping member 40 bears against cable 16 to clamp it tightly against the base of groove 30 to secure it in the groove. Ridges 32 in groove 30 serve additionally to hold the cable in the groove. As is best seen in FIG. 6, clamping member 40 is disposed adjacent the end of beam 14 and its convex under surface provides an arcuate surface about which cable 16 is trained where it extends outwardly from the end of the beam.

Portion 24 of the beam end cap provides a protective covering for the end of the channel and that portion of cable 16 whic hextends over the end of the beam. Such a protective covering inhibits damage to the cable where it bends around the end of the beam and inhibits damage which otherwise might occur if the bare ends of beam 14 were to come in contact with other articles.

While an embodiment of the invention has been described herein, it should be obvious to those skilled in the art that variations and modifications are possible without departing from the spirit of the invention.

It is claimed and desired to secure by Letters Patent:

1. An end cap for a beam comprising
   a block member having a cable-receiving groove extending along its top,
   means for securing said block member to a beam with the groove extending in the direction of the axis of the beam and with one portion of the block member against the underside of the beam and another portion of the block member and a portion of said groove extending outwardly from an end of such beam, and
   means for securing a cable in said groove comprising a removable clamping element which overlies said groove and is secured in such position with said block member secured to such beam.

2. The cap of claim 1, wherein said block member has an elongated channel formed in its upper surface which extends transversely of said cable-receiving groove, and said clamping element comprises an elongated member having a convex underside which is adapted to seat in said channel with its convex underside overlying said groove.

3. In a load-handling device including an elongated beam and a cable extending longitudinally along the underside of and outwardly from an end of the beam, a beam end cap comprising
   a block member having a cable-receiving groove extending along its top,
   means securing said block member to the beam with one portion of the member against the underside of the beam and another portion of the member disposed outwardly from said end of the beam, said groove extending in the direction of the axis of the beam, said other portion including a shoulder abutting the end of the beam, and
   means securing the cable in said groove comprising a removable clamping element which overlies the cable in the groove and is clamped against the cable with the block member secure dto the beam.

4. The device of claim 3, wherein said clamping element is disposed adjacent the end of said beam and has a convex undersurface which provides an arcuate surface about which the cable may extend.

5. In a load-handling device including an elongated beam and a cable extending longitudinally along the underside of and outwardly from an end of the beam, a beam end cap comprising
   a block member having a cable-receiving groove extending along its top and an elongated channel extending transversely of the cable-receiving groove,
   means securing said block member to the beam with one portion of the member against the underside of the beam and another portion of the member disposed outwardly from said end of the beam, said groove extending in the direction of the axis of the beam, said other portion including a shoulder abutting the end of the beam, and
   means securing the cable in said groove comprising an elongated clamping element seated in said channel and overlying said groove, said clamping element having a convex underside in the region overlying said groove.

References Cited

UNITED STATES PATENTS

| | | | |
|---|---|---|---|
| 2,793,904 | 5/1957 | Gale | 294—74 |
| 2,510,674 | 6/1950 | Andersen | 294—74 |
| 3,493,128 | 2/1970 | Silvert | 214—10.5 |

FOREIGN PATENTS

| | | | |
|---|---|---|---|
| 1,210,975 | 11/1970 | Great Britain | 294—67 E |

EVON C. BLUNK, Primary Examiner

J. D. CHERRY, Assistant Examiner

U.S. Cl. X.R.

294—67 R, 74